United States Patent
Zhang et al.

(10) Patent No.: US 8,565,226 B1
(45) Date of Patent: Oct. 22, 2013

(54) DATA TRANSMISSION SYSTEM USED BETWEEN MULTIPLE SERVERS, DATA INTERFACE DEVICE, AND DATA TRANSMISSION METHOD

(71) Applicant: Huawei Technologies Co., Ltd., Shenzhen (CN)

(72) Inventors: Gong Zhang, Shenzhen (CN); Defeng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/860,768

(22) Filed: Apr. 11, 2013

Related U.S. Application Data (63) Continuation of application No. PCT/CN2012/083803, filed on Oct. 31, 2012.

(30) Foreign Application Priority Data

Apr. 23, 2012 (CN) .......................... 2012 1 0121407

(51) Int. Cl.
 *H04L 12/28* (2006.01)
 *H04J 1/16* (2006.01)

(52) U.S. Cl.
 USPC .............. 370/360; 370/252; 370/389; 398/45

(58) Field of Classification Search
 USPC ............................ 370/252, 360, 389; 398/45
 See application file for complete search history.

(56) References Cited

U.S. PATENT DOCUMENTS

| 2004/0076151 | A1 | 4/2004 | Fant et al. | |
|---|---|---|---|---|
| 2009/0296719 | A1* | 12/2009 | Maier et al. | 370/400 |
| 2010/0061240 | A1 | 3/2010 | Sindhu et al. | |

FOREIGN PATENT DOCUMENTS

| CN | 101155120 A | 4/2008 |
|---|---|---|
| CN | 101483860 A | 7/2009 |
| CN | 101621719 A | 1/2010 |

OTHER PUBLICATIONS

Guo, et al., "BCube: A High Performance, Server-centric Network Architecture for Modular Data Centers," SIGCOMM, Aug. 17-21, 2009, pp. 63-74.
Foreign Communication From a Counterpart Application, PCT Application PCT/CN2012/083803, International Search Report dated Feb. 7, 2013, 6 pages.
Foreign Communication From a Counterpart Application, PCT Application PCT/CN2012/083803, Written Opinion dated Feb. 7, 2013, 5 pages.

* cited by examiner

*Primary Examiner* — John Pezzlo
(74) *Attorney, Agent, or Firm* — Conley Rose, P.C.; Grant Rodolph; Nicholas K. Beaulieu (57) ABSTRACT

A data transmission system used between multiple servers, a data interface device, and a data transmission method, which belong to the field of network communications, are disclosed. The data transmission system includes: a data interface device configured to receive a data stream from a server, and generate a forwarding request according to the data stream, where the forwarding request includes a destination address of the data stream; a controller device configured to generate a forwarding configuration signal according to the forwarding request; and an all-optical switching matrix configured to set an optical switching path between two data interface devices according to the forwarding configuration signal, so as to forward the data stream to a server specified by the destination address, where the two data interface devices are data interface devices connected to the source server of the data stream and the server specified by the destination address.

13 Claims, 7 Drawing Sheets

DATA TRANSMISSION SYSTEM USED BETWEEN MULTIPLE SERVERS, DATA INTERFACE DEVICE, AND DATA TRANSMISSION METHOD

CROSS-REFERENCE TO RELATED APPLICATIONS

This application is a continuation of International Application No. PCT/CN2012/083803, filed on Oct. 31, 2012, which claims priority to Chinese Patent Application No. 201210121407.0, filed on Apr. 23, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of computer networks, and in particular, to a data transmission system used between multiple servers, a data interface device, and a data transmission method.

BACKGROUND

With the rapid development and popularization of cloud computing, the design and deployment of a data center, as a carrier for computing and storage, have become a focus of research in academic and industrial circles.

A data center generally includes multiple servers and a data transmission system disposed between the servers. Conventional data centers mostly adopt a two-layer tree structure including a core layer and an access layer, or a three-layer tree structure including a core layer, a convergence layer, and an access layer. Such tree structures have many defects. In one aspect, a multi-layer overlay architecture of two or three layers adopted has the defects such as high costs of a core switching device, large service delay between multi-hop devices, and limited flexibility. In another aspect, the conventional data centers mostly use the Ethernet transmission technology, in which the throughput of data transmission is rather limited. In still another aspect, the conventional data centers do not have a unified control and management plane, so scheduling of data streams cannot be considered from the perspective of full mesh topology.

With the increasingly growing scale of services borne by a data center, the data center itself faces challenges such as increased number of servers, growing requirements for bandwidth resources, and lower service delay. To meet higher requirements of users for the data center, multiple new data transmission architectures capable of being used in the data center exist in the prior art. For example, in a new data transmission system in the prior art, a three-layer network structure in the conventional data centers is simplified into a one-layer network architecture. The data transmission system specifically includes three parts: a node part, an interconnection part, and a director part. The node part is a distributed decision engine in the data transmission system, and is configured to connect a server so that the server is connected to the data transmission system for transmitting data, and the node part itself can be used as an Ethernet router. The interconnection part is a high-speed transmission device in the data transmission system and is configured to directly interconnect and transmit data of the node parts. The director part is a control part in the data transmission system and provides a common window for controlling all devices as one device. The main feature of the data transmission system is that a distributed data plane where all ports are interconnected is formed by multiple node parts, so that one-hop reachability from any node to another node is implemented.

However, first, the three constituent parts of the data transmission system must use auxiliary devices of the same series, and different products produced by different manufacturers are not supported in the networking process, that is, the compatibility of the data transmission system is poor; second, although the data transmission system can implement one-hop reachability from any node to another node, the data transmission system fails to meet requirements for the data transmission speed in some situations; and third, the networking costs are high when the data center is applied.

SUMMARY

To enable a data transmission system to have high compatibility and implement zero-hop reachability from any server to another server and low networking costs, embodiments of the present invention provide a data transmission system used between multiple servers, a data interface device, and a data transmission method. The technical solutions are described as follows.

According to one aspect of the present invention, an embodiment of the present invention provides a data transmission system used between multiple servers, where the system includes: a data interface device disposed on each server side, a controller device connected to the data interface device, and an all-optical switching matrix connected to the data interface device and the controller device, where the data interface device is configured to receive a data stream from a server, and generate a forwarding request according to the data stream, where the forwarding request includes a destination address of the data stream; the controller device is configured to generate a forwarding configuration signal according to the forwarding request; and the all-optical switching matrix is configured to set an optical switching path between two data interface devices according to the forwarding configuration signal, so as to forward the data stream to a server specified by the destination address, where the two data interface devices are data interface devices connected to the source server of the data stream and the server specified by the destination address, respectively.

According to another aspect of the present invention, an embodiment of the present invention further provides a data interface device, where the device includes: a data stream receiving module configured to receive a data stream from a server connected to the data stream receiving module; a data identification module configured to generate corresponding stream identification information according to the data stream; a forwarding scheduling module configured to generate a forwarding request according to the stream identification information, where the forwarding request includes a destination address of the data stream; a control signal receiving and sending module configured to send the forwarding request to a controller device and receive a confirmation signal of the forwarding request; and a data receiving and sending module configured to convert the data stream into an optical signal according to the confirmation signal of the forwarding request, and send the optical signal to an all-optical switching matrix.

According to still another aspect of the present invention, an embodiment of the present invention further provides a data transmission method, where the method includes: receiving a data stream of a server; generating corresponding stream identification information according to the data stream; generating a forwarding request according to the stream identification information, where the forwarding request includes a destination address of the data stream; sending the forwarding request to a controller device so that the controller device generates control logic, and receiving a confirmation signal of the forwarding request that is fed back after the controller device generates the control logic; and converting the data stream into an optical signal according to the confirmation signal of the forwarding request, and sending the optical signal to an all-optical switching matrix, so that the all-optical switching matrix forwards the data stream according to the control logic.

Beneficial effects of the technical solutions provided by the embodiments of the present invention are described as follows.

First, the data interface device connects a server to the controller device only used for control and management and the all-optical switching matrix only used for optical switching, so as to implement the separation between control and forwarding processes, increase the deployment flexibility of the data transmission system, and solve a compatibility problem of products of different types.

Second, by using the data interface device and the all-optical switching matrix, zero-hop reachability from any server to another server is implemented, the throughput of the network is increased, and the transmission delay is lowered.

The data interface device can be implemented by adopting a data card, so that the costs of the data interface device are quite low and the networking costs of the data transmission system are effectively reduced.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention more comprehensible, the following further describes the embodiments of the present invention in detail with reference to the accompanying drawings.

Embodiment 1

Figure 1:
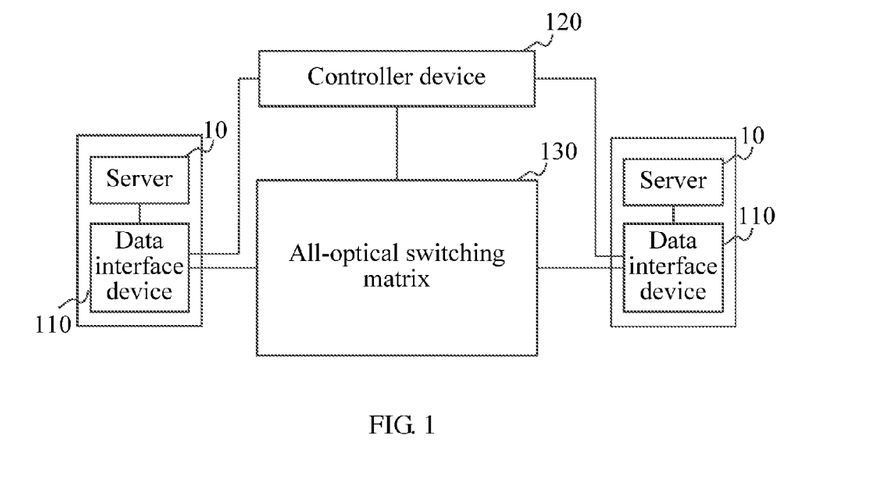
FIG. 1 is a structural block diagram of a data transmission system used between multiple servers provided by Embodiment 1 of the present invention.

Referring to FIG. 1, FIG. 1 shows a structural block diagram of a data transmission system used between multiple servers provided by Embodiment 1 of the present invention. The data transmission system includes a data interface device 110 disposed on each server 10, a controller device 120 connected to the data interface device 110, and an all-optical switching matrix 130 connected to the data interface device 110 and the controller device 120.

The data interface device 110 is configured to receive a data stream from the server 10 and generate a forwarding request according to the received data stream, where the forwarding request may include information such as a source address, a destination address, and a data size of the data stream. In specific implementation, the data interface device 110 may be implemented as a data card. The data card may be connected to the server 10 through a Peripheral Component Interconnect (PCI) Express bus interface, and the data card may be further connected to the controller device 120 through an Ethernet interface and may also be connected to the all-optical switching matrix 130 through an optical signal interface.

The controller device 120 is configured to generate a forwarding configuration signal according to the forwarding request sent by the data interface device 110. Specifically, the controller device 120 may generate, according to current status information of the all-optical switching matrix 130 and the information such as the source address, the destination address, and the data size of the data stream in the forwarding request sent by the data interface device 110.

The all-optical switching matrix 130 is configured to set an optical switching path between two data interface devices 110 according to the forwarding configuration signal generated by the controller device 120, so as to forward the data stream to a server specified by the destination address, where the two data interface devices are data interface devices connected to the source server of the data stream and the server specified by the destination address, respectively. The all-optical switching matrix 130 is an optical switching network that directly transmits an optical signal from one input port to another output port, and multiple optical switches that exist in the all-optical switching matrix can form an optical switching path between any two ports.

Figure 2:
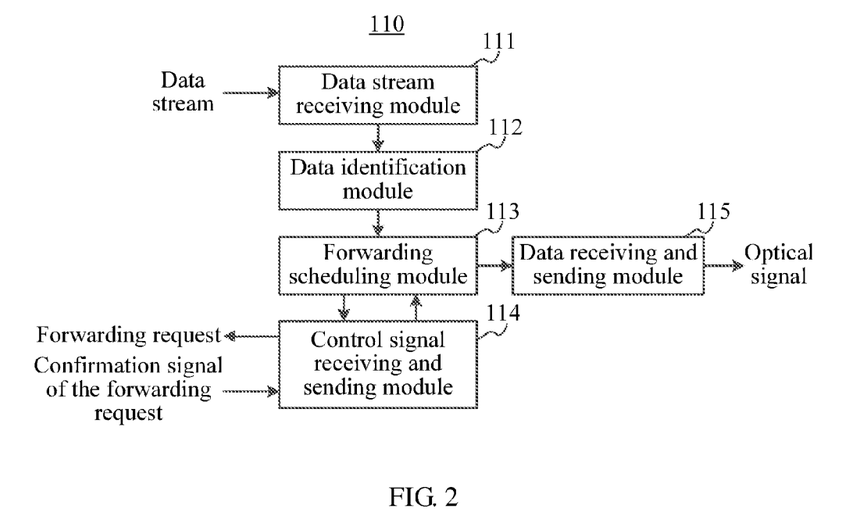
FIG. 2 is a structural block diagram of a data interface device provided by Embodiment 1 of the present invention.

Referring to FIG. 2 as well, FIG. 2 shows a structural block diagram of a data interface device provided by Embodiment 1 of the present invention. The data interface device 110 includes a data stream receiving module 111, a data identification module 112, a forwarding scheduling module 113, a control signal receiving and sending module 114, and a data receiving and sending module 115.

The data stream receiving module 111 is configured to receive a data stream from a server connected to the data stream receiving module 111. Because each data interface device 110 is connected to one server 10, the data stream receiving module 111 can receive a data stream from a server connected to the data stream receiving module 111, and the data stream receiving module 111 may be implemented by adopting a PCI Express bus interface and a relevant protocol.

The data identification module 112 is configured to generate corresponding stream identification information according to the data stream received by the data stream receiving module 111. The stream identification information is generally generated according to information such as a source address, a destination address, and a data size of the data stream.

The forwarding scheduling module 113 is configured to generate a forwarding request according to the stream identification information, where the forwarding request at least includes a destination address of the data stream, and the forwarding request may further include information such as a source address and a data size of the data stream.

The control signal receiving and sending module 114 is configured to send the forwarding request generated by the forwarding scheduling module 113 to the controller device 120, so that the controller device 120 can generate, according to the information in the forwarding request, a forwarding configuration signal used to control the all-optical switching matrix 130. The control signal receiving and sending module 114 is further configured to receive a confirmation signal of the forwarding request, where the confirmation signal of the forwarding request is a signal generated after the controller device 120 controls the all-optical switching matrix 130 to complete configuration of an optical switching path, and is used to represent that the optical switching path in the all-optical switching matrix 130 is ready and that the data interface device 110 can start to forward the data stream.

The data receiving and sending module 115 is configured to convert the data stream into an optical signal according to the confirmation signal of the forwarding request that is received by the control signal receiving and sending module 114, and send the optical signal to the all-optical switching matrix. After the control signal receiving and sending module 114 receives the confirmation signal of the forwarding request, the data receiving and sending module 115 converts the data stream into an optical signal and sends the optical signal to the all-optical switching matrix 130.

Figure 3:
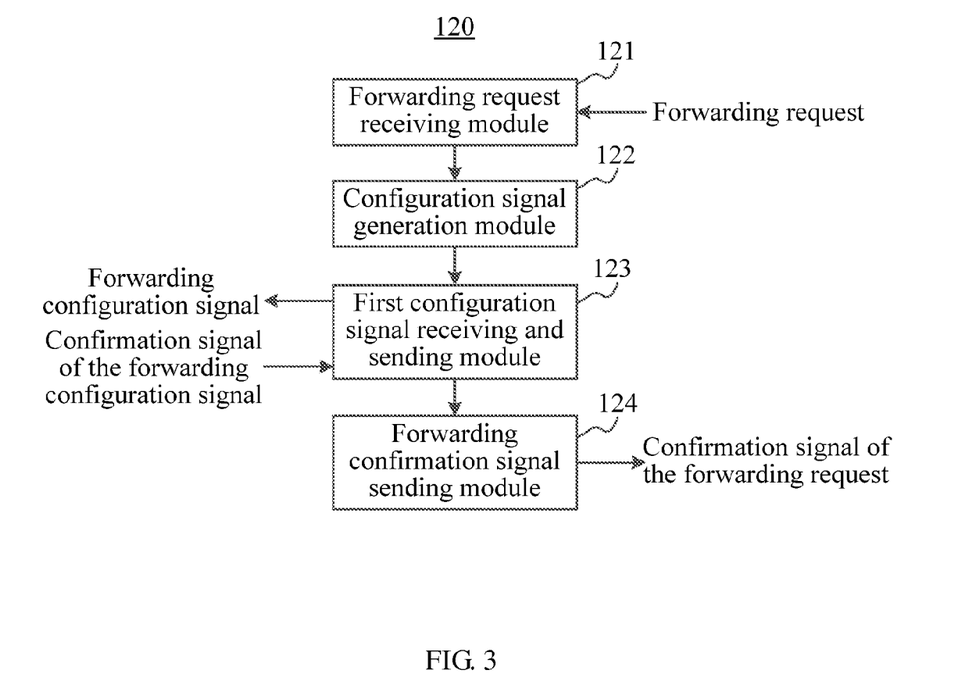
FIG. 3 is a structural block diagram of a controller device provided by Embodiment 1 of the present invention.

Referring to FIG. 3 as well, FIG. 3 shows a structural block diagram of a controller device provided by Embodiment 1 of the present invention. The controller device 120 includes a forwarding request receiving module 121, a configuration signal generation module 122, a first configuration signal receiving and sending module 123, and a forwarding confirmation signal sending module 124.

The forwarding request receiving module 121 is configured to receive a forwarding request sent by the data interface device 110, where the forwarding request generally includes a destination address of a data stream to be transmitted.

The configuration signal generation module 122 is configured to generate a forwarding configuration signal according to the forwarding request received by the forwarding request receiving module 121. The forwarding configuration signal may be generated according to information in the forwarding request and a current status of the all-optical switching matrix 130, and is mainly used to control the all-optical switching matrix 130 to form an optical switching path between a source address of the data stream and the destination address.

The first configuration signal receiving and sending module 123 is configured to send the forwarding configuration signal to the all-optical switching matrix 130, so that the all-optical switching matrix 130 configures each optical switch that exists in the all-optical switching matrix according to the forwarding configuration signal, so as to form a corresponding optical switching path. The first configuration signal receiving and sending module 123 is further configured to receive a confirmation signal of the forwarding configuration signal, where the confirmation signal of the forwarding configuration signal is generated after the all-optical switching matrix 130 completes the configuration process, and is used to represent that the optical switching path in the all-optical switching matrix 130 is ready.

The forwarding confirmation signal sending module 124 is configured to send a confirmation signal of the forwarding request to the data interface device 110 according to the confirmation signal of the forwarding configuration signal that is received by the first configuration signal receiving and sending module 123, so that the data interface device 110 utilizes the ready all-optical switching matrix to forward the data stream.

Figure 4:
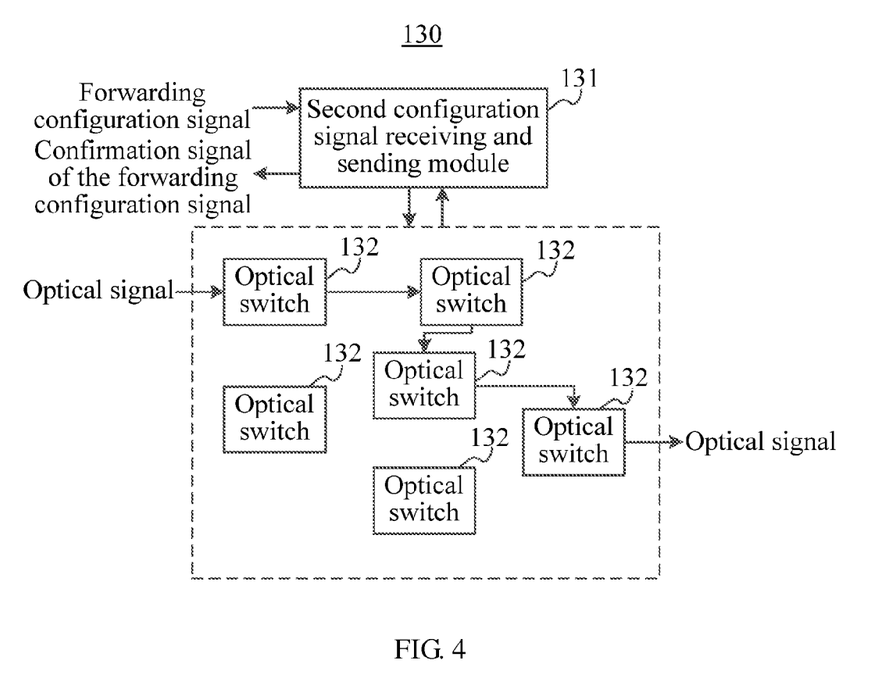
FIG. 4 is a structural block diagram of an all-optical switching matrix provided by Embodiment 1 of the present invention.

Referring to FIG. 4 as well, FIG. 4 shows a structural block diagram of an all-optical switching matrix provided by Embodiment 1 of the present invention. The all-optical switching matrix 130 includes a second configuration signal receiving and sending module 131 and several optical switches 132.

The second configuration signal receiving and sending module 131 is configured to receive a forwarding configuration signal from the controller device 120.

The several optical switches 132 are configured to set an optical switching path between two data interface devices 110 according to the forwarding configuration signal received by the second configuration signal receiving and sending module 131, where the two data interface devices 110 are data interface devices connected to a source server of a data stream to be transmitted and a server specified by a destination address, respectively. In a specific embodiment, the optical switches 132 may be an optical switching switch array based on a semiconductor optical amplifier (SOA), and the optical switches 132 between the data interface devices 110 may be connected in the manner of a cross switch matrix, so as to implement full interconnection between K-level servers. Moreover, after an optical switching path between the two data interface devices 110 is formed, direct connection between the two data interface devices 110 can be implemented, and the optical switching path is used as a direct connection channel for transmission of the data stream.

The second configuration signal receiving and sending module 131 is further configured to send a confirmation signal of the forwarding configuration signal to the controller device 120 when the optical switches 132 complete the configuration, where the confirmation signal of the forwarding configuration signal is used to represent that the relevant optical switching path is ready.

To sum up, in the data transmission system provided by Embodiment 1 of the present invention, the data interface device connects a server to the controller device used for only control and management and the all-optical switching matrix used for only optical switching, so as to separate the control process and the forwarding process from each other, increase the deployment flexibility of the data transmission system, and solve a compatibility problem of products of different types. In another aspect, by using the data interface device directly connected to the server as an input and output device of the all-optical switching matrix, zero-hop reachability from any server to another server is implemented, the throughput of the network is increased, and the transmission delay is lowered. In still another aspect, the data interface device can be implemented by adopting a data card, so that the costs of the data interface device are quite low and the networking costs of the data transmission system are effectively reduced.

Embodiment 2

Figure 5:
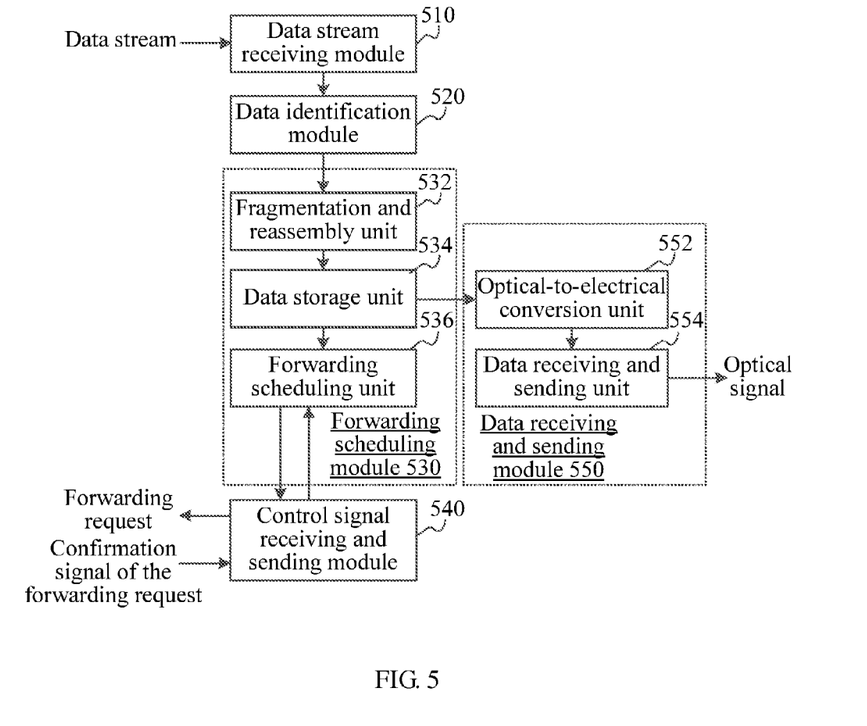
FIG. 5 is a structural block diagram of a data interface device provided by Embodiment 2 of the present invention.

Referring to FIG. 5, FIG. 5 shows a structural block diagram of a data interface device provided by Embodiment 2 of the present invention. The data interface device includes a data stream receiving module 510, a data identification module 520, a forwarding scheduling module 530, a control signal receiving and sending module 540, and a data receiving and sending module 550.

The data stream receiving module 510 is configured to receive a data stream from a server connected to the data stream receiving module 510. Because each data interface device is connected to one server, the data stream receiving module 510 can receive a data stream from a server connected to the data stream receiving module 510, and the data stream receiving module 510 may be implemented by adopting a PCI Express bus interface and a relevant protocol.

The data identification module 520 is configured to generate corresponding stream identification information according to the data stream received by the data stream receiving module 510. The stream identification information is generally generated according to information such as a source address, a destination address, and a data size of the data stream.

The forwarding scheduling module 530 is configured to generate a forwarding request according to the stream identification information, where the forwarding request at least includes a destination address of the data stream. Specifically, the forwarding scheduling module 530 may include a fragmentation and reassembly unit 532, a data storage unit 534, and a forwarding scheduling unit 536. The fragmentation and reassembly unit 532 is configured to fragment the data stream into several data stream segments, for example, fragment the data stream by performing fragmentation and reassembly; the data storage unit 534 is configured to store the data stream segments generated by the fragmentation and reassembly unit 532, for example, store the data stream segments in queues; and the forwarding scheduling unit 536 is configured to generate a forwarding request according to stream identification information of the data stream segments stored by the data storage unit 534, where the forwarding request may include a source address, a destination address, and stream segment size information of the data stream segments.

The control signal receiving and sending module 540 is configured to send the forwarding request generated by the forwarding scheduling module 530 to a controller device, so that the controller device can generate, according to information in the forwarding request, a forwarding configuration signal used to control an all-optical switching matrix. The control signal receiving and sending module 540 is further configured to receive a confirmation signal of the forwarding request, where the confirmation signal of the forwarding request is a signal generated after the controller device controls the all-optical switching matrix to complete configuration of an optical switching path, and is used to represent that the optical switching path in the all-optical switching matrix is ready and that the data interface device can start to forward the data stream. In a specific embodiment, the control signal receiving and sending module 540 may interact with the controller device through an Ethernet transmission interface.

The data receiving and sending module 550 is configured to convert the data stream into an optical signal according to the confirmation signal of the forwarding request, and send the optical signal to the all-optical switching matrix. Specifically, the data receiving and sending module 550 may include an optical-to-electrical conversion unit 552 and a data receiving and sending unit 554. The optical-to-electrical conversion unit 552 is configured to convert the data stream segments stored by the data storage unit 534 from an electrical signal to an optical signal after the control signal receiving and sending module 540 receives the confirmation signal of the forwarding request; and the data receiving and sending unit 554 is configured to send the optical signal of the data stream segments to the all-optical switching matrix. In other words, after receiving the confirmation signal of the forwarding request, the control signal receiving and sending module 540 may deliver the confirmation signal of the forwarding request to the forwarding scheduling unit 536 for processing; the forwarding scheduling unit 536 notifies, according to the confirmation signal of the forwarding request, the data storage unit 534 of sending corresponding data stream segments that are in the queues to the optical-to-electrical conversion unit 552; the optical-to-electrical conversion unit 552 converts the data stream segments stored by the data storage unit 534 from an electrical signal to an optical signal; and the data receiving and sending unit 554 is configured to send the optical signal of the data stream segments to the all-optical switching matrix.

It is easy to think that the data interface device is not only used for sending a data stream to the all-optical switching matrix, but also used for receiving, from the all-optical switching matrix, a data stream of which a destination address is the destination address of a server to which the data interface device belongs. The details are provided below:

The data receiving and sending unit 554 is further configured to receive a data stream from the all-optical switching matrix, where a destination address of the data stream is a server connected to this data interface device, and the data stream may include an optical signal of several data stream segments.

The optical-to-electrical conversion unit 552 is further configured to convert the data stream segments received by the data receiving and sending unit 554 from the optical signal to an electrical signal.

The data storage unit 534 is further configured to buffer the electrical signal of the data stream segments that is converted by the optical-to-electrical conversion unit 552.

The fragmentation and reassembly unit 532 is further configured to reassemble the data stream segments buffered in the data storage unit 534 into a data stream.

The data stream receiving module 510 is further configured to send the data stream reassembled by the fragmentation and reassembly unit 532 to a server.

The receiving process is basically an inverse process of the foregoing sending process and specific details are not elaborated.

To sum up, the data interface device provided by Embodiment 2 of the present invention connects a server to the controller device only used for control and management and the all-optical switching matrix only used for optical switching, so as to separate the control process and the forwarding process from each other, increase the deployment flexibility of the data transmission system, and solve a compatibility problem of products of different types.

Embodiment 3

Figure 6:
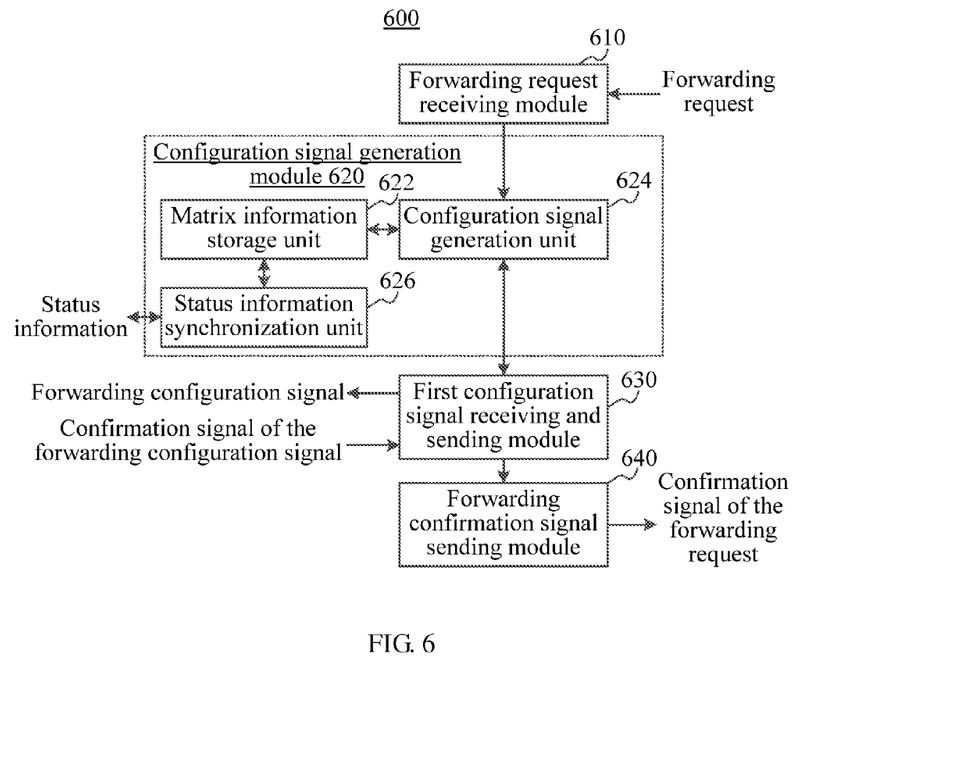
FIG. 6 is a structural block diagram of a controller device provided by Embodiment 3 of the present invention.

To enhance the deployment flexibility of the data transmission system, a controller device may also adopt distributed control logic. The distributed control logic may be formed by at least two or more controller devices, each controller device may be connected to several data interface devices, and the controller devices are also connected to each other. Referring to FIG. 6, FIG. 6 shows a structural block diagram of a controller device provided by Embodiment 3 of the present invention. The controller device 600 may include a forwarding request receiving module 610, a configuration signal generation module 620, a first configuration signal receiving and sending module 630, and a forwarding confirmation signal sending module 640.

The forwarding request receiving module 610 is configured to receive a forwarding request sent by a data interface device, where the forwarding request generally includes information such as a source address, a destination address, and a data size of a data stream to be transmitted.

The configuration signal generation module 620 is configured to generate a forwarding configuration signal according to the forwarding request received by the forwarding request receiving module 610. Specifically, the configuration signal generation module 620 may include a matrix information storage unit 622, a configuration signal generation unit 624, and a status information synchronization unit 626. The matrix information storage unit 622 is configured to store status information of an all-optical switching matrix, for example, switch information of each optical switch in the all-optical switching matrix. The configuration signal generation unit 624 is configured to generate a forwarding configuration signal according to the forwarding request received by the forwarding request receiving module 610 and the status information of the all-optical switching matrix that is stored by the matrix information storage unit 622. For example, the configuration signal generation unit 624 may generate, according to the source address and the destination address of the data stream in the forwarding request and a switch status of each optical switch in the current all-optical switching matrix, a forwarding configuration signal used to form an optical switching path between a source address and a destination address. Because status information of an all-optical switching matrix that is stored in each controller device may be different, the status information synchronization unit 626 may synchronize, at a predetermined time interval and in coordination with status information synchronization units 626 in other controller devices 600, the status information of the all-optical switching matrix that is stored in each matrix information storage unit 622.

The first configuration signal receiving and sending module 630 is configured to send the forwarding configuration signal to the all-optical switching matrix, so that the all-optical switching matrix configures each optical switch that exists in the all-optical switching matrix according to the forwarding configuration signal, so as to form a corresponding optical switching path. The first configuration signal receiving and sending module 630 is further configured to receive a confirmation signal of the forwarding configuration signal, where the confirmation signal of the forwarding configuration signal is generated after the all-optical switching matrix completes the configuration process, and is used to represent that the optical switching path in the all-optical switching matrix is ready.

The forwarding confirmation signal sending module 640 is configured to send a confirmation signal of the forwarding request to the data interface device according to the confirmation signal of the forwarding configuration signal that is received by the first configuration signal receiving and sending module 630, so that the data interface device utilizes the ready all-optical switching matrix to forward the data stream.

To sum up, the distributed control logic provided by Embodiment 3 can further increase the deployment flexibility of the data transmission system, and solve a compatibility problem of products of different types.

Embodiment 4

Figure 7:
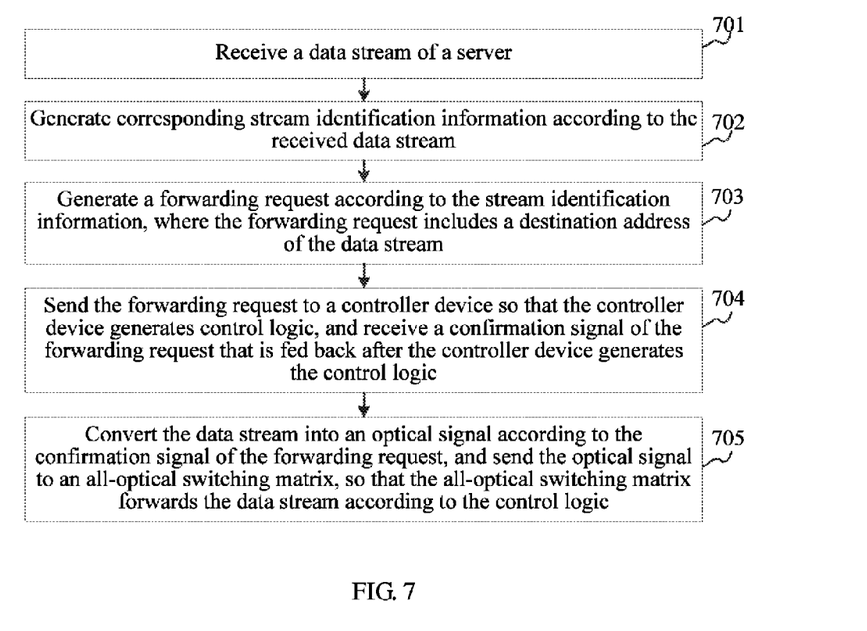
FIG. 7 is a method flow chart of a data transmission method provided by Embodiment 4 of the present invention.

Referring to FIG. 7, FIG. 7 shows a method flow chart of a data transmission method provided by Embodiment 4 of the present invention. The data transmission method can be used in a data interface device of the foregoing data transmission system, and the data transmission method includes the following steps:

Step 701: Receive a data stream of a server.

The data interface device may receive a data stream of a server connected to the data interface device.

Step 702: Generate corresponding stream identification information according to the received data stream.

The data interface device generates corresponding stream identification information according to the received data stream.

Step 703: Generate a forwarding request according to the stream identification information, where the forwarding request includes a destination address of the data stream.

The data interface device may fragment the data stream into several data stream segments; the data interface device stores the data stream segments; and the data interface device may generate a forwarding request according to stream identification information of the data stream segments, where the forwarding request may include a source address, a destination address, and stream segment size information of the data stream segments.

Step 704: Send the forwarding request to a controller device so that the controller device generates control logic, and receive a confirmation signal of the forwarding request that is fed back after the controller device generates the control logic.

The data interface device may send the forwarding request to a controller device so that the controller device generates control logic, and receive a confirmation signal of the forwarding request that is fed back after the controller device generates the control logic.

Step 705: Convert the data stream into an optical signal according to the confirmation signal of the forwarding request, and send the optical signal to an all-optical switching matrix, so that the all-optical switching matrix forwards the data stream according to the control logic.

The data interface device converts the data stream segments from an electrical signal to an optical signal according to the confirmation signal of the forwarding request, and then the data interface device may send the optical signal of the data stream segments to an all-optical switching matrix, so that the all-optical switching matrix forwards the data stream according to the control logic generated by the controller device.

To sum up, in the data transmission method provided by Embodiment 4 of the present invention, a signal related to control and a signal related to a data stream are processed by the controller device and the all-optical switching matrix, so as to separate the control process and the forwarding process from each other, increase the deployment flexibility of the data transmission system, and solve a compatibility problem of products of different types.

It should be noted that, in Embodiment 2, the data interface device provided by the foregoing embodiment is described through an example of dividing the data interface device into the foregoing functional modules, and in the actual application, the foregoing functions may be accomplished by different functional modules as required, that is, the internal structure of the device is divided into different functional modules, so as to accomplish all or a part of the functions in the foregoing description. In addition, the data interface device provided by the foregoing embodiment belongs to the same concept as the embodiment of the data transmission method, and reference may be made to the method embodiment for the specific implementation process, which is not elaborated herein.

A person of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. A data transmission system used between multiple servers comprising:
   a data interface device disposed on each server side;
   a controller device connected to the data interface device; and
   an all-optical switching matrix connected to the data interface device and the controller device,
   wherein the data interface device is configured to receive a data stream from a source server and generate a forwarding request according to the data stream,
   wherein the forwarding request comprises a destination address of the data stream,
   wherein the controller device is configured to generate a forwarding configuration signal according to the forwarding request,
   wherein the all-optical switching matrix is configured to set an optical switching path between two data interface devices according to the forwarding configuration signal to forward the data stream to a destination server specified by the destination address, and
   wherein the two data interface devices are data interface devices connected to the source server of the data stream and the destination server specified by the destination address.

2. The data transmission system according to claim 1, wherein the data interface device comprises a data stream receiving module, a data identification module, a forwarding scheduling module, a control signal receiving and sending module, and a data receiving and sending module, wherein the data stream receiving module is configured to receive the data stream of the source server connected to the data stream receiving module, wherein the data identification module is configured to generate corresponding stream identification information according to the data stream, wherein the forwarding scheduling module is configured to generate the forwarding request according to the stream identification information, wherein the forwarding request comprises the destination address of the data stream, wherein the control signal receiving and sending module is configured to send the forwarding request to the controller device and receive a confirmation signal of the forwarding request, and wherein the data receiving and sending module is configured to convert the data stream into an optical signal according to the confirmation signal of the forwarding request and send the optical signal to the all-optical switching matrix.

3. The data transmission system according to claim 1, wherein the controller device comprises a forwarding request receiving module, a configuration signal generation module, a first configuration signal receiving and sending module, and a forwarding confirmation signal sending module, wherein the forwarding request receiving module is configured to receive the forwarding request, wherein the forwarding request comprises the destination address of the data stream, wherein the configuration signal generation module is configured to generate the forwarding configuration signal according to the forwarding request, wherein the first configuration signal receiving and sending module is configured to send the forwarding configuration signal to the all-optical switching matrix and receive a confirmation signal of the forwarding configuration signal, and wherein the forwarding confirmation signal sending module is configured to send a confirmation signal of the forwarding request to the data interface device according to the confirmation signal of the forwarding configuration signal.

4. The data transmission system according to claim 3, wherein the configuration signal generation module comprises a matrix information storage unit and a configuration signal generation unit, wherein the matrix information storage unit is configured to store status information of the all-optical switching matrix, and wherein the configuration signal generation unit is configured to generate the forwarding configuration signal according to the forwarding request and the status information of the all-optical switching matrix.

5. The data transmission system according to claim 4, wherein a number of the controller devices is at least two, wherein the configuration signal generation module further comprises a status information synchronization unit, and wherein the status information synchronization unit is configured to synchronize, at a predetermined time interval, status information of the all-optical switching matrix that is stored in each matrix information storage unit.

6. The data transmission system according to claim 1, wherein the all-optical switching matrix comprises a second configuration signal receiving and sending module and several optical switches that exist between every two data interface devices, wherein the second configuration signal receiving and sending module is configured to receive the forwarding configuration signal, wherein the several optical switches are configured to set an optical switching path between two data interface devices according to the forwarding configuration signal, wherein the two data interface devices are data interface devices connected to the source server of the data stream and the destination server specified by the destination address, and wherein the second configuration signal receiving and sending module is further configured to send a confirmation signal of the forwarding configuration signal to the controller device when the optical switches complete the configuration.

7. A data interface device comprising:
   a data stream receiving module configured to receive a data stream of a server connected to the data stream receiving module;
   a data identification module configured to generate corresponding stream identification information according to the data stream;
   a forwarding scheduling module configured to generate a forwarding request according to the stream identification information, wherein the forwarding request comprises a destination address of the data stream;
   a control signal receiving and sending module configured to send the forwarding request to the controller device and receive a confirmation signal of the forwarding request; and
   a data receiving and sending module configured to convert the data stream into an optical signal according to the confirmation signal of the forwarding request and send the optical signal to the all-optical switching matrix.

8. The data interface device according to claim 7, wherein the forwarding scheduling module comprises a fragmentation and reassembly unit, a data storage unit, and a forwarding scheduling unit, wherein the fragmentation and reassembly unit is configured to fragment the data stream into several data stream segments, wherein the data storage unit is configured to store the data stream segments, wherein the forwarding scheduling unit is configured to generate a forwarding request according to stream identification information of the data stream segments, and wherein the forwarding request comprises a source address, a destination address, and stream segment size information.

9. The data interface device according to claim 8, wherein the data receiving and sending module comprises an optical-to-electrical conversion unit and a data receiving and sending unit, wherein the optical-to-electrical conversion unit is configured to convert the data stream segments from an electrical signal to an optical signal according to the confirmation signal of the forwarding request, and wherein the data receiving and sending unit is configured to send the optical signal of the data stream segments to the all-optical switching matrix.

10. The data interface device according to claim 9, wherein the data interface device comprises a data interface card, wherein the data stream receiving module adopts a Peripheral Component Interconnect (PCI) Express interface, and wherein the control signal receiving and sending module adopts an Ethernet transmission interface.

11. A data transmission method comprising:
receiving a data stream of a server;
generating corresponding stream identification information according to the data stream;
generating a forwarding request according to the stream identification information, wherein the forwarding request comprises a destination address of the data stream;
sending the forwarding request to a controller device such that the controller device generates control logic;
receiving a confirmation signal of the forwarding request that is fed back after the controller device generates the control logic;
converting the data stream into an optical signal according to the confirmation signal of the forwarding request; and
sending the optical signal to an all-optical switching matrix such that the all-optical switching matrix forwards the data stream according to the control logic.

12. The data transmission method according to claim 11, wherein generating the forwarding request according to the stream identification information comprises:
fragmenting the data stream into several data stream segments;
storing the data stream segments; and
generating the forwarding request according to stream identification information of the data stream segments, wherein the forwarding request comprises a source address, a destination address, and stream segment size information.

13. The data transmission method according to claim 12, wherein converting the data stream into the optical signal according to the confirmation signal of the forwarding request comprises converting the data stream segments from an electrical signal to the optical signal according to the confirmation signal of the forwarding request, and wherein sending the optical signal to the all-optical switching matrix such that the all-optical switching matrix forwards the data stream according to the control logic specifically comprises sending the optical signal of the data stream segments to the all-optical switching matrix such that the all-optical switching matrix forwards the data stream according to the control logic.

* * * * *